C. V. CARLSON.
AUTOMATIC FEEDING DEVICE FOR CREAM SEPARATORS.
APPLICATION FILED DEC. 13, 1917.

1,301,818.

Patented Apr. 29, 1919.
2 SHEETS—SHEET 2.

INVENTOR
Carl V. Carlson
BY
Fred P. Jorin
ATTORNEY

UNITED STATES PATENT OFFICE.

CARL V. CARLSON, OF CHATCOLET, IDAHO.

AUTOMATIC FEEDING DEVICE FOR CREAM-SEPARATORS.

1,301,818.  Specification of Letters Patent.  Patented Apr. 29, 1919.

Application filed December 13, 1917. Serial No. 206,875.

*To all whom it may concern:*

Be it known that I, CARL V. CARLSON, citizen of the United States, residing at Chatcolet, in the county of Benewah and State of Idaho, have invented certain new and useful Improvements in Automatic Feeding Devices for Cream-Separators, of which the following is a specification.

This invention relates to improvements in automatic feeding devices and has for its principal object to provide an improved and novel type of automatic fluid feed mechanism for cream separators and the like; to provide a device which automatically varies the quantity of milk flowing from the tank into the separator in proportion to the speed of the separator. Another object of my device is to provide an improved and novel type of automatic governor. Still another object of my device is to provide an improved sanitary valve for cream separator tanks. In the operation of cream separators it is usual to fill the tank and open the stop cock to what appears the proper size stream. As the speed of the separator may change due to the variation in the motor power and other things the quantity of milk discharged into the separator remains constant therefore sometimes the separator runs idle or without sufficient milk to work properly while at other times the milk may overflow the separator. My device is designed to obviate the above objections and to permit the supply of milk to flow to the separator automatically and in direct ratio to the speed of the separator.

Other objects will appear as my invention is more fully explained in the following specification, illustrated in the accompanying drawings and pointed out in the appended claims.

Figure 2:
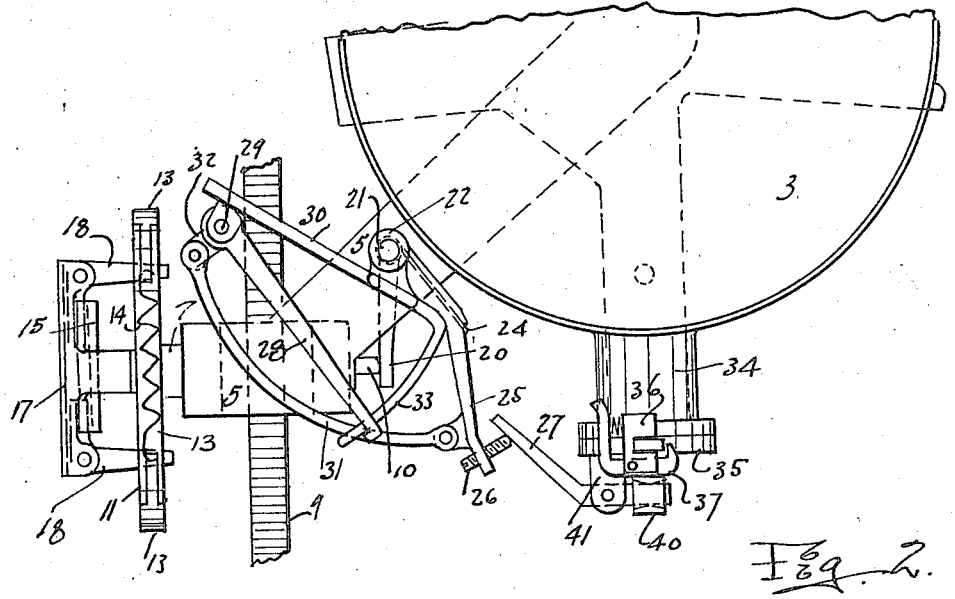
Figure 1:
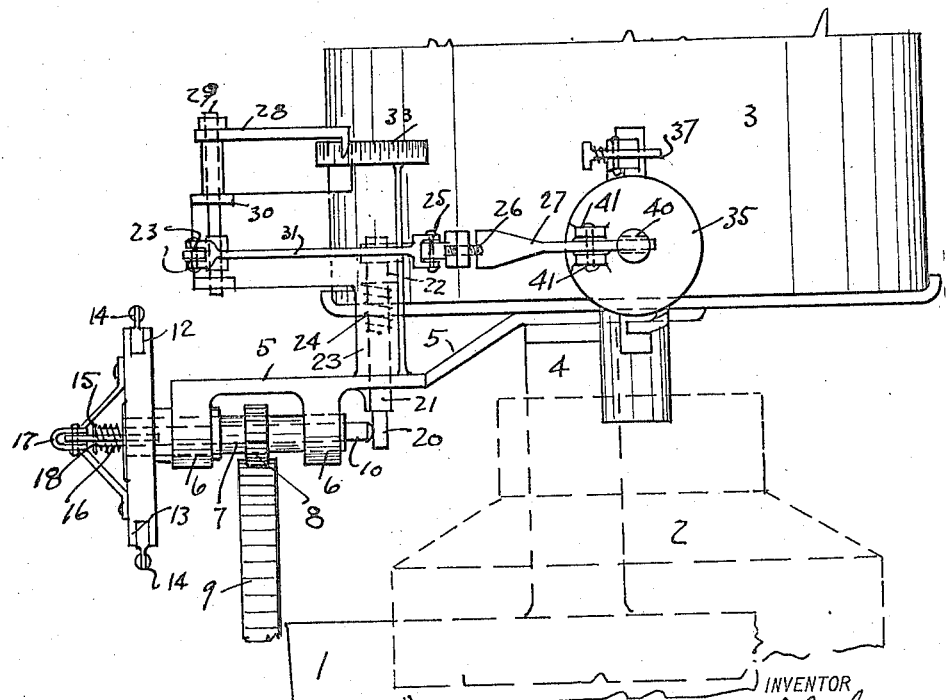
Figure 3:
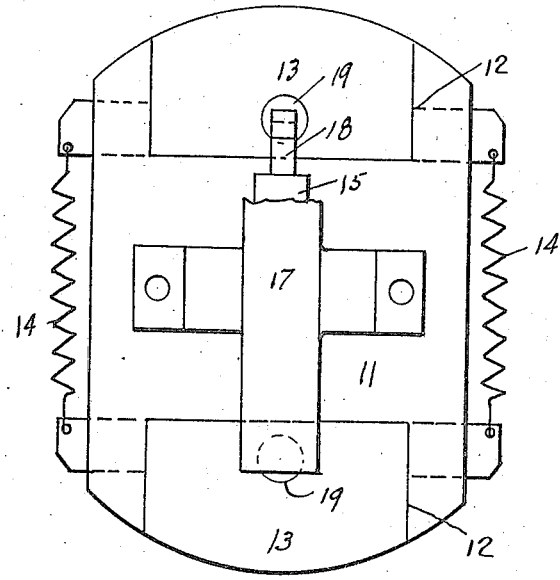
Figure 4:
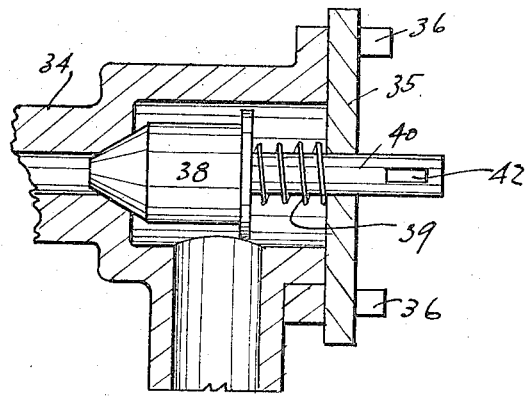

In the drawings Figure 1 is a side elevation of my device shown attached to a fragment of a cream separator. Fig. 2 is a plan of same. Fig. 3 is an enlarged face elevation of my improved governor. Fig. 4 is an enlarged central cross section of the tank valve.

Referring more particularly to the drawing numeral 1 indicates the frame work of a cream separator upon which a separator 2 is mounted. A tank 3 is supported from frame 1 by a bracket 4. My device is preferably secured to bracket 4. The device consists of a frame member 5 which supports all of the mechanism which is not attached directly to the tank valve. Bearings 6 are mounted upon the frame 5 and revolubly support a tubular shaft 7 to which a pinion 8 is secured. Pinion 8 coöperates with the main drive gear 9 of the separator. A governor stem 10 is slidably carried within shaft 7 beyond which it projects at either end. To one end of shaft 7 a centrifugal governor is secured. My governor consists of a stationary casting 11 which is secured to the shaft 7 and is provided with oppositely disposed slots 12 within which weights 13 are mounted. Weights 13 are normally held against centrifugal force by means of springs 14 which connect the said weights. Governor stem 10 projects through a member 11 and acts against a lever block 15 under the influence of a spring 16. Lever block 15 is housed in a yoke 17 which is secured to member 11 and upon each end of which is pivoted a bell crank lever 18. The outer arms of the bell crank lever 18 bear against lever block 15 while the other arms project through opening 19 in weights 13. It will be understood that when the governor revolves rapidly that the weights 13 tend to pull away from the stationary casting 11 thereby moving the inner arms or bell crank lever 18 outwardly while the outer arms force the lever block 15 and the governor stem 10 inwardly against the thrust of spring 16. The inner end of governor stem 10 coöperates with an arm 20. Arm 20 is secured to the lower end of a shaft 21 which is mounted in bearings 22 upon an upright member 23 which is integral with the frame 5. A spring 24 normally retains arm 20 in contact with stem 10. A valve operating arm 25 is secured to the upper end of shaft 21 and through the medium of an adjustable screw 26 operates a valve handle 27. An indicating arm 28 is secured to a shaft 29 which takes bearings in a bracket 30 which is outstanding from upright member 23. The indicating arm is operated by means of a link 31 which is pivoted at one end to the valve operating arm 25 and at the other end to a lever 32 which is secured to shaft 29. The point of indicator arm 28 wipes around a graduated quadrant 33 thereby indicating the speed of the separator as well as the discharge of the tank 3. A valve body 34 is secured to tank 3 adjacent its bottom and is provided with a quick opening cover 35 which engages lugs 36 on valve body 34 and is held in locked position by means of a pawl 37. A valve 38 is normally retained seated against valve body 34 by means of a spring 39 which bears against cover 35. A valve stem 40 projects through cover 35 and is integral with valve 38. Valve handle 27 is pivoted to lugs 41 which are outstanding on cover 35. One end of valve handle 27 coöperates with the screw 26 as previously stated while the other end projects through an opening 42 in stem 40. In operation the rotation of gear 9 rotates pinion 8, shaft 7 and the governor. The rotation of the governor operates as previously described to push the governor stem 10 inwardly against the arm 20. The movement of arm 20 causes a movement of the valve operating arm 25 through the medium of the shaft 21. The movement of the operating arm 25 against valve handle 27 causes the valve handle to open the valve in proportion as the handle itself is moved. When the valve is open the milk is allowed to flow from tank 3 into the separator. It will be understood that the speed of the governor depends upon the speed of the separator, and that the speed of the governor automatically controls the opening of the valve 38 thereby controlling the supply of milk to the separator. It will further be noted that the valve and tank are entirely separable from the rest of the mechanism and may be removed without any disconnection. The valve itself is an important feature as it is very quickly and easily taken apart for cleaning and the like.

While I have shown a particular form of embodiment of my invention, I am aware that many minor changes therein will readily suggest themselves to others skilled in the art without departing from the spirit and scope of the invention, and I therefore desire to avoid being limited to the exact form shown and described.

Having described my invention, what I claim as new and desire to protect by Letters Patent, is:—

1. In combination, a cream separator, a tank above the separator, a spout extending from the tank and disposed to discharge to the separator, a valve in the spout, a spring to normally close the valve, an arm extending from the valve, a governor, a rod, a lever extending from the rod, and adapted to be operated upon by the governor, a lever extending from the upper end of the rod and positioned to contact with the arm extending from the valve, an indicator, a connection between the indicator and the lever on the upper end of the rod, whereby, when the governor actuates the valve, the indicator is operated to indicate the movement of the valve.

2. In combination, a cream separator, a tank above the separator, a spout extending from the tank and disposed to discharge to the separator, a valve in the spout, a spring to normally close the valve, an arm extending from the valve, a governor, a rod, a lever extending from the rod, and adapted to be operated upon by the governor, a lever extending from the upper end of the rod and positioned to contact with the arm extending from the valve, a second rod, a crank arm at the bottom of said second rod, a connection between the crank arm and the lever on the upper end of the first mentioned rod, an indicating lever on the upper end of said second mentioned rod, and a curved plate provided with a scale with which the indicating lever coöperates, whereby, when the governor operates the valve, the indicating lever will indicate on the scale, the movement of the valve.

In testimony whereof I affix my signature.

CARL V. CARLSON.

Copies of this patent may be obtained for five cents each, by addressing the "Commissioner of Patents, Washington, D. C."